United States Patent [19]
Juen et al.

[11] Patent Number: 5,948,856
[45] Date of Patent: Sep. 7, 1999

[54] ORGANOSILOXANE COMPOSITIONS YIELDING MACHINABLE EROSION RESISTANT ELASTOMERS

[75] Inventors: Donnie Ray Juen, Sanford; Michael G. Krueger, Midland; Lawrence Joseph Rapson, Bay City, all of Mich.

[73] Assignee: Dow Corning Corporation, Midland, Mich.

[21] Appl. No.: 09/005,762

[22] Filed: Jan. 12, 1998

Related U.S. Application Data

[63] Continuation of application No. 08/373,714, Jan. 17, 1995, abandoned.

[51] Int. Cl.$^6$ ............................................. C08K 3/40
[52] U.S. Cl. ........................... 524/847; 523/219; 523/218; 524/862; 528/15; 528/31; 528/32; 525/478
[58] Field of Search ...................... 524/847, 862; 523/218, 219; 528/15, 31, 32; 525/478

[56] References Cited

U.S. PATENT DOCUMENTS

| | | | |
|---|---|---|---|
| 2,962,809 | 12/1960 | Short et al. ............................. | 29/445 |
| 4,072,635 | 2/1978 | Jeram ..................................... | 260/2.55 |
| 4,370,160 | 1/1983 | Zicmelis ................................. | 71/117 |
| 4,500,659 | 2/1985 | Kiroupa et al. ........................ | 524/862 |
| 4,580,794 | 4/1986 | Gibbons ................................. | 277/228 |
| 4,666,371 | 5/1987 | Alderson ............................... | 415/197 |
| 5,373,078 | 12/1994 | Juen et al. ............................. | 528/15 |
| 5,661,198 | 8/1997 | Inatani et al. ......................... | 523/179 |

FOREIGN PATENT DOCUMENTS 791568 3/1958 European Pat. Off. .

*Primary Examiner*—Margaret W. Glass Moore
*Attorney, Agent, or Firm*—Richard I. Gearhart

[57] ABSTRACT

Curable organosiloxane compositions that cure by a platinum group metal catalyzed hydrosilation reaction to yield machinable elastomers exhibiting a high resistance to erosion contain an alkenyl-functional organosiloxane copolymer as the reinforcing agent together with quartz and organic or inorganic microspheres as the non-reinforcing filler. The concentration and density of the microspheres are preferably within specified limits.

3 Claims, No Drawings

ORGANOSILOXANE COMPOSITIONS YIELDING MACHINABLE EROSION RESISTANT ELASTOMERS

This is a continuation of U.S. Ser. No. 08/373,714, now abandoned.

BACKGROUND OF THE INVENTION

1. Field of the Invention

This invention relates to machinable organosiloxane elastomers. More particularly, this invention relates to organosiloxane compositions yielding erosion-resistant elastomers suitable for use as abradable seals between the moving and stationary elements of motors and turbine type compressors.

2. Background Information

The use of filled organosiloxane resins to form abradable seals in axial flow compressors of the type used in turbines for aircraft jet engines is taught in British Patent No. 791,568, which issued on Mar. 5, 1958. The purpose of the seal is to minimize the clearance between tips of the rotor blades and the housing of the compressor. The clearance is formed by applying a layer of curable resin on the housing that is slightly thicker than the distance between the tips of the rotating blades and the compressor housing. During initial operation of the compressor the rotating blades undergo a thermally induced expansion and cut a groove in the resin layer to a depth that corresponds to the clearance between the edges of the blades and the housing. To ensure continued operation of the compressor at maximum efficiency, once the initial groove is formed there should be no erosion of material from the resin layer other than that resulting from contact between this layer and the rotating blades. During operation of turbine-type aircraft engines various materials, including abrasives such as sand, grit and other types of debris, water, and relatively large objects such as birds are drawn into the intake of the compressor stages. The physical properties of the cured material used to form the abradable seal should be such as to resist erosion resulting from the impact of these foreign materials.

To achieve the physical properties desired for abradable seals various types of reinforcing and non-reinforcing fillers have been incorporated into the material used to form the seal. Reinforcing fillers are typically finely divided forms of precipitated and fumed types of silica. These fillers can be used in combination with non-reinforcing fillers such as quartz, calcium carbonate, talc and microspheres formed from glass or organic resins.

A shortcoming of prior art organosiloxane resin and elastomer compositions, including those described in the prior art as suitable for forming abradable seals for turbine type compressors on aircraft, is the tendency of some of these compositions, particularly those containing finely divided silica as the reinforcing filler, to erode relatively rapidly during operation.

The objective of this invention is to improve the machinability and increase the erosion resistance of cured organosiloxane compositions used as abradable seals without adversely affecting other desirable properties of the cured material.

SUMMARY OF THE INVENTION

The objectives of the present invention are achieved by using a specified class of organosiloxane copolymers containing alkenyl radicals as the reinforcing agent and using the combination of quartz and organic or inorganic microspheres as non-reinforcing fillers. To achieve machinability without a substantial decrease in erosion resistance of cured materials, the concentration of the microspheres should be maintained within specified limits.

DETAILED DESCRIPTION OF THE INVENTION

This invention provides an improved organosiloxane composition for preparing machinable elastomers, said composition comprising A. a curable polyorganosiloxane containing at least two alkenyl radicals per molecule;

B. an organohydrogensiloxane containing at least three silicon-bonded hydrogen atoms per molecule in an amount sufficient to crosslink said polyorganosiloxane;

C. a curing catalyst selected from the group consisting of metals from the platinum group of the periodic table and compounds of said metals in a quantity sufficient to promote curing of said composition; and D. sufficient quantities of reinforcing and non-reinforcing agents to impart machinability and erosion resistance to said composition.

The improvement comprises the presence as the said reinforcing agent of a resinous organosiloxane copolymer comprising $R^1{}_3SiO_{1/2}$, $R^1{}_2R^2$ and $SiO_{4/2}$ units; and the presence as the non-reinforcing fillers of from 5 to 60 weight percent of finely divided quartz, based on the weight of said composition, and at least 20 percent, based on the total volume of said composition, of thermally resistant microspheres, wherein each $R^1$ is individually selected from monovalent hydrocarbon radicals and $R^2$ is an alkenyl radical, with the proviso that at least 2 weight percent of the hydrocarbon radicals in said copolymer are alkenyl radicals.

Characterizing features of the present compositions are the use of a specified type of resinous organosiloxane copolymer as the reinforcing agent; and the presence of quartz and a specified concentration range of thermally resistant microspheres as non-reinforcing fillers. The material from which the microspheres are formed should have sufficient thermal stability to resist decomposition and/or softening at temperatures to which the cured elastomer is exposed during use, which are typically about 200° C.

When used as abradable seals for turbines, the present combination of organosiloxane copolymers and fillers imparts the desirable combination of a smooth surface in the groove that is cut by the rotating blades of the turbine and resistance to erosion of the elastomer.

The Curable Polyorcanosiloxane (Ingredient A)

An alkenyl-containing polyorganosiloxane, referred to hereinafter as ingredient A, is the major curable ingredient of the present compositions. To achieve curing, ingredient A contains at least two silicon-bonded alkenyl radicals in each molecule.

Suitable alkenyl radicals contain from 1 to about 10 carbon atoms and are exemplified by, but not limited to, vinyl, allyl and 5-hexenyl. The silicon-bonded organic groups other than alkenyl radicals present in ingredient A are typically monovalent hydrocarbon and halogenated monovalent hydrocarbon radicals exemplified by, but not limited to, alkyl radicals such as methyl, ethyl and propyl; aryl radicals such as phenyl; and halogenated alkyl radicals such as 3,3,3-trifluoropropyl.

The molecular structure of ingredient A is not critical to the present invention and is determined by the physical properties desired in the cured composition. To achieve a useful level of tensile properties in the elastomers, the molecular weight of this ingredient should be sufficient to achieve a viscosity at 25° C. greater than about 0.1 Pa.s. The upper limit for the molecular weight of ingredient A is not specifically restricted, and is typically limited only by the processability of the curable organosiloxane composition. The present polyorganosiloxanes typically exhibit a viscosity of from 100 to 100,000 centipoise (0.1 to 100 Pa.s).

Preferred embodiments of ingredient A are polydiorganosiloxanes represented by the general formula I

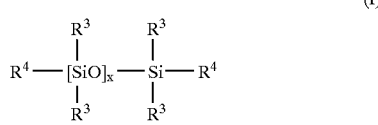

wherein each $R^3$ is individually selected from monovalent hydrocarbon radicals, $R^4$ represents an alkenyl radical, and x represents a degree of polymerization equivalent to a viscosity of at least 100 centipoise (0.1 Pa.s), preferably from 1 to 100 Pa.s. A viscosity of at least 100 centipoise is considered necessary to obtain cured elastomers exhibiting the desired combination of physical properties.

As used in the present specification, monovalent hydrocarbon radicals include, but are not limited to, alkyl radicals containing from 1 to about 20 carbon atoms such as methyl, ethyl, n-hexyl and n-dodecyl; alkenyl such as vinyl and allyl; cycloalkyl such as cyclohexyl; aryl radicals such as phenyl and naphthyl; aralkyl such as benzyl; and alkaryl such as tolyl and xylyl.

The hydrocarbon radicals represented by $R^3$ are unsubstituted or can contain substituents such as halogen atoms that will not adversely affect the storage stability and curing of the present compositions or the properties of cured articles prepared from these compositions.

The two $R^3$ substituents on each of the silicon atoms in formula I can be identical or different, and can contain from 1 to about 20 carbon atoms. A range of from 1 to 10 carbon atoms is preferred based on the availability of the corresponding monomers. Most preferably, at least one of the hydrocarbon radicals on each silicon atom is methyl, and any remainder are alkenyl radicals such as vinyl and 5-hexenyl, phenyl and/or 3,3,3-trifluoropropyl, this preference being based on the availability of the reactants typically used to prepare the polydiorganosiloxane and the properties of cured elastomers prepared from these polydiorganosiloxanes. For the same reasons, the alkenyl radicals represented by $R^4$ are preferably vinyl or 5-hexenyl.

Representative embodiments of ingredient A containing ethylenically unsaturated hydrocarbon radicals only at the terminal positions include, but are not limited to, dimethylvinyl-siloxy-terminated polydimethylsiloxanes, dimethylvinylsiloxy- terminated polymethyl-3,3,3-trifluoropropylsiloxanes, dimethylvinylsiloxy-terminated-dimethylsiloxane/3,3,3-trifluoropropylmethylsiloxane copolymers and dimethylvinylsiloxy-terminated dimethylsiloxane/methylphenylsiloxane copolymers.

Methods for preparing ingredient A of the present compositions by hydrolysis and condensation of the corresponding halosilanes or by condensation of the cyclic polydiorganosiloxanes are sufficiently disclosed in the patent and other literature that a detailed description in this specification is not necessary.

For applications requiring high levels of physical properties such as tensile and/or tear strength it may be desirable to include in the curable organosiloxane composition a second polydiorganosiloxane containing ethylenically unsaturated hydrocarbon radicals bonded to both terminal and non-terminal silicon atoms.

The Organohydrocensiloxane Curing Agent (Ingredient B)

The preferred curable organosiloxane compositions of this invention contain at least one organohydrogensiloxane that functions as a crosslinking agent for ingredient A. In the presence of the hydrosilation catalyst, referred to as ingredient C, the silicon-bonded hydrogen atoms in ingredient B undergo an addition reaction, known in the art as hydrosilation, with the silicon-bonded alkenyl groups in ingredient A, resulting in crosslinking and curing of the composition.

Ingredient B must contain at least 2 silicon-bonded hydrogen atoms in each molecule. If ingredient A contains only two alkenyl radicals per molecule, ingredient B must contain an average of more than two silicon-bonded hydrogen atoms to achieve a crosslinked structure in the final cured product.

The silicon-bonded organic groups present in ingredient B are selected from the same group of monovalent hydrocarbon and halogenated hydrocarbon radicals as the organic groups of ingredient A. The organic groups in ingredient B are preferably substantially free of ethylenic or acetylenic unsaturation. The molecular structure of ingredient B can be straight chain, branch-containing straight chain, cyclic, network or a combination of these.

While the molecular weight of ingredient B is not specifically restricted, viscosities in the range of 3 to 10,000 centipoise (0.003 to 10 Pa.s) at 25 degrees Centigrade are preferred.

The concentration of ingredient B is sufficient to provide a molar ratio of silicon-bonded hydrogen atoms to alkenyl radicals in the curable composition of from 0.5 to 20. A range of from 0.5 to 2 is preferred.

When the curable composition contains less than 0.5 moles of silicon-bonded hydrogen atoms per mole of alkenyl radicals it may not be possible to achieve the desired physical properties following curing. The physical properties of the cured article may vary with time when this ratio exceeds about 20 moles of silicon-bonded hydrogen per mole of alkenyl radicals.

The Platinum-Containing Hydrosilation Reaction Catalyst (Ingredient C)

Curing of the present compositions is catalyzed by a hydrosilation catalyst that is a metal from the platinum group of the periodic table or a compound of such a metal. These metals include platinum, palladium and rhodium. Platinum and platinum compounds are preferred based on the high activity level of these catalysts in hydrosilation reactions.

Examples of preferred curing catalysts include but are not limited to platinum black, platinum metal on various solid supports, chloroplatinic acid, alcohol solutions of chloroplatinic acid, and complexes of chloroplatinic acid with liquid ethylenically unsaturated compounds such as olefins and organosiloxanes containing ethylenically unsaturated hydrocarbon radicals bonded to silicon. Complexes of chloroplatinic acid with the aforementioned organosiloxanes containing ethylenically unsaturated hydrocarbon radicals are described in U.S. Pat. No. 3,419,593, which issued to David N. Willing on Dec. 31, 1968. The relevant portions of this patent are incorporated herein by reference as a teaching of preferred catalysts.

The concentration of ingredient C in the present compositions is equivalent to a metal concentration of from 0.1 to 500 parts by weight of metal, preferably from 1 to 50 parts by weight of metal, per million parts (ppm), based on the combined weight of ingredients A and B.

Curing does not proceed satisfactorily at below 0.1 ppm of metal, while using more than 500 ppm results in no appreciable increase in cure rate, and is therefore uneconomical.

Platinum Catalyst Inhibitor

Mixtures of the aforementioned ingredients A, B and C may begin to cure at ambient temperature. To obtain a longer working time or "pot life" for a two-part composition or a longer shelf life for a one-part composition, the activity of the catalyst under ambient conditions can be retarded or suppressed by addition of a suitable inhibitor.

Known catalyst inhibitors include the acetylenic compounds disclosed in U.S. Pat. No. 3,445,420, which issued on May 20, 1969 to Kookootsedes et al. Acetylenic alcohols such as 2-methyl-3-butyn-2-ol constitute a preferred class of inhibitors that will suppress the activity of a metal-containing catalyst at 25° C. Compositions containing these catalyst inhibitors typically require heating at temperatures of 70° C. or above to cure at a practical rate.

When it is desired to increase the pot life of a curable composition under ambient conditions, this can be accomplished using an alkenyl substituted siloxane of the type described in U.S. Pat. No. 3,989,667, which issued on Nov. 2, 1976 to Lee and Marko. Cyclic methylvinylsiloxanes are preferred.

Inhibitor concentrations as low as one mole of inhibitor per mole of metal will in some instances impart satisfactory storage stability and cure rate. In other instances inhibitor concentrations of up to 500 or more moles of inhibitor per mole of metal are required. The optimum concentration for a given inhibitor in a given composition can readily be determined by routine experimentation and does not constitute part of this invention.

When it is desired to prepare compositions that exhibit substantially infinite stability under ambient conditions as a one-part composition, but will cure rapidly at elevated temperatures, microencapsulated particles of a finely divided catalyst in a thermoplastic polymer that is insoluble in the curable organosiloxane composition and melts at the desired curing temperature of the composition can be used. The encapsulated catalysts are preferably used in combination with an acetylenic compound as a catalyst inhibitor.

The Reinforcing Agent

Resinous organosiloxane copolymers suitable for use as the reinforcing agent in the present compositions are solid materials at 25° C. and comprise repeating units of the general formulae, $R^1{}_3SiO_{1/2}$, $R^1{}_2R^2 SiO_{1/2}$ and $SiO_{4/2}$. Each of the $R^1$ substituents on the two units containing these substituents represent identical or different monovalent hydrocarbon radicals and $R^2$ is an alkenyl radical. The term "monovalent hydrocarbon radicals" encompasses alkyl, halogenated alkyl, cycloalkyl, aryl, alkaryl, and aralkyl radicals. The hydrocarbon radicals represented by $R^1$ are preferably alkyl, most preferably methyl, and the alkenyl radicals are vinyl or 5-hexenyl. The molar ratio of the combination of triorganosiloxy units to $SiO_{4/2}$ units in the resinous copolymer is from 0.7 to 1.2, inclusive. The units containing alkenyl radicals constitute at least 2 and preferably from 2 to 8 percent of the total weight of the copolymer, which preferably contains at least two alkenyl radicals per molecule.

In preferred embodiments of the copolymer the range for the molar ratio of $R^1{}_2R^2SiO_{1/2}:R^1{}_3SiO_{1/2}:SiO_{4/2}$ units is 0.08–0.1:0.06–1:1.

The resinous copolymers used as reinforcing agents can be prepared as described in U.S. Pat. No. 2,676,182, which issued to Daudt and Tyler on Apr. 20, 1954 and is hereby incorporated in this specification by reference thereto to teach the preparation of and the scope of these resins. The copolymers described in this patent contain from 2 to 23 percent by weight of hydroxyl groups, which is considerably above the maximum level of about 0.8 weight percent preferred for precursors of the present copolymers. The hydroxyl content of the precursor can be conveniently reduced to the desired level by employing a higher concentration of triorganosiloxy units than the concentration range taught by Daudt et al.

The concentration range for the resinous copolymer that will provide the desired degree of reinforcement without increasing the viscosity of the present compositions to the extent that they are difficult to process will be determined by the molecular weight and functionality of the resin. The concentration range for preferred copolymers is from 5 to 60 weight percent, preferably from 10 to 20 weight percent, based on the weight of the curable organosiloxane composition.

The Quartz Filler

The combination of resinous reinforcing agent and quartz improves the machinability of the cured elastomer and is responsible for the resistance to erosion exhibited by the present compositions following curing relative to compositions prepared using the same curable ingredients but with silica as the reinforcing filler. The present curable compositions contain from 5 to about 60 weight percent, preferably from 15 to 30 weight percent of quartz. The particle size of the quartz is preferably from 0.5 to about 50 microns, most preferably about 5 microns.

The Thermally Stable MicrosPheres

The presence of at least 20 volume percent of thermally resistant microspheres in the curable organosiloxane composition is in part responsible for the smooth surface that remains when a portion of a cured elastomeric coating formed from the composition has been sheared away or otherwise abraded by the rotating blade of a turbine or other cutting device.

It should be apparent that the smoothest possible surface at the interface between the edge of a compressor blade and the inner surface of the compressor wall is required to minimize leakage and the associated loss in efficiency.

In addition to this beneficial contribution of the microspheres, the present inventors discovered that the erosion resistance of the cured material decreases as the concentration and density of the microspheres are increased. To obtain the optimum balance between the positive and negative effects of the microspheres, these additives should constitute from 30 to about 45 volume percent of the curable composition and the density of the microspheres should preferably be from 0.2 to about 0.6 g/cc. Glass microspheres within this density range are typically hollow. At densities below about 0.2 g/cc, using glass microspheres the diameter of the microspheres becomes sufficiently large or the walls sufficiently thin such that the microspheres are easily broken during processing of preferred curable compositions. It should be apparent that the shear required to mix a curable composition, which is responsible for breakage of the microspheres, decreases as the viscosity of the composition decreases. The lower operable limit for the density of the microspheres will be therefore determined by the viscosity of the curable composition.

The microspheres can be formed from any material that will not soften or degrade at temperatures that the cured elastomer is exposed to during use. Because a preferred intended end use of cured coatings prepared from the present compositions is as abradable seals in the intake stages of jet engines where the temperature can reach 200° C. or higher, glass is the preferred material. If the intended end use of cured composition does not require this level of heat resistance, the microspheres can be formed from thermosetting organic resins such as epoxide and phenolic resins.

Preparation of Curable Compositions

The compositions of this invention can be prepared by combining all of ingredients at ambient temperature. Any of the mixing techniques and devices described in the prior art can be used for this purpose. The particular device used will be determined by the viscosity of the ingredients and the final curable composition. Suitable mixers include but are not limited to paddle type mixers, kneader type mixers and two- and three-roll rubber mills. Cooling of the ingredients during mixing may be desirable to avoid premature curing of the composition.

To maximize storage stability the curable compositions are preferably kept in closed containers until used. If greater storage stability is desired, the compositions can be packaged in two or more containers with the organohydrogensiloxane (ingredient B) and the metal group metal catalyst in different containers.

Two-part compositions cure over a period of several hours under ambient conditions, whereas one-part compositions require days to years to cure under these conditions. As is true for other compositions that cure by a platinum-catalyzed hydrosilation reaction, curing can be accelerated by heating. Curing temperatures of about 150° C. are preferred. Elastomers prepared using the present curable compositions are particularly useful as abradable seals in gas turbine engines.

EXAMPLES

The following examples describe preferred embodiments of the abradable organosiloxane compositions of the present invention, and should not be interpreted as limiting the scope of the present invention as defined in the accompanying claims. Unless otherwise specified all parts and percentages in the examples are by weight and viscosities are measured at 25° C.

Compositions of the present invention referred to hereinafter as I and II were prepared using the following procedure:

A curable composition prepared by mixing 126 parts of a mixture consisting essentially of 82 weight percent of a dimethylvinylsiloxy-terminated polydimethylsiloxane having a viscosity of about 55 Pa.s at 25° C. as ingredient A and 18 weight percent of a resinous benzene-soluble copolymer containing triorganosiloxy units and $SiO_2$ units in the mol ratio of about 0.7 mol of triorganosiloxy unit per mol of $SiO_2$ units as the resinous reinforcing agent. The triorganosiloxy units were trimethylsiloxy and dimethylvinylsiloxy, and the copolymer contained from 1.4 to 2.2 weight percent of silicon-bonded vinyl radicals;

38 parts of quartz exhibiting an average particle size of 5 microns;

0.13 part of a reaction product of hexachloroplatinic acid and sym-tetramethyldivinyldisiloxane that has been diluted with a liquid dimethylvinylsiloxy terminated polydimethylsiloxane in an amount sufficient to achieve a platinum content of 0.7 weight percent;

30 parts of a trimethylsiloxy-terminated polydiorganosiloxane containing an average of five methylhydrogensiloxane units and three dimethylsiloxane units per molecule with a silicon-bonded hydrogen atom content in the range from about 0.7 to 0.8 weight percent; and 1 part of octamethylcyclosiloxane as a platinum catalyst inhibitor.

To the ingredients of the curable composition were added hollow glass microspheres with an average diameter of 55 microns and a density of 0.25 g/cc. and a pigment composition containing 13 weight percent of zinc oxide, 7 weight percent of carbon black and 79 weight percent of a dimethylvinylsiloxy-terminated polydimethylsiloxane having a viscosity of about 0.4 Pa.s at 25° C. The microspheres are available as Eccosphere SI from Emerson and Cuming.

Composition I contained 14.3 parts, equivalent to 44.4 volume percent, of the glass microspheres and 6.9 parts of the pigment composition. Composition II contained 9.8 parts, equivalent to 33.3 volume percent, of the glass microspheres and 7.6 parts of the pigment composition.

Composition IIIc was prepared for comparative purposes, and contained 4.8 parts, equivalent to 16.5 volume percent of the microspheres.

For comparative purposes three curable organosiloxane compositions containing silica as the reinforcing filler were evaluated. The comparative compositions (IVc, Vc and VIc) were prepared using the following procedure:

A curable organosiloxane composition was prepared by blending
  148 parts of a dimethylvinylsiloxy terminated polydimethylsiloxane having a viscosity of about 2.1 Pa.s at 25 degrees C.;
  33 parts of fume silica that had been treated with hexamethyldisilazane;
  0.1 part of a reaction product of hexachloroplatinic acid and sym-tetramethyldivinyldisiloxane that has been diluted with a liquid dimethylvinylsiloxy terminated polydimethylsiloxane in an amount sufficient to achieve a platinum content of about 0.7 weight percent;
  4.5 part of a dimethylvinylsiloxy terminated dimethylsiloxane/methylvinylsiloxane copolymer containing an average of 96 dimethylsiloxane and 2 methylvinylsiloxane units per molecule;
  1.74 parts of water;
  13 parts of trimethylsiloxy-terminated polydiorganosiloxane containing an average of five methylhydrogensiloxane units and three dimethylsiloxane units per molecule with a silicon-bonded hydrogen atom content in the range from about 0.7 to 0.8 weight percent; and
  0.6 part of octamethylcyclotetrasiloxane as a catalyst inhibitor.

The ingredients of the curable composition were blended with the following ingredients:

composition IVc—7.1 parts of the pigment composition used in composition I and 16.7 parts of the same glass microspheres, composition Vc—7.1 part of this pigment composition and 16.7 parts of the microspheres;

composition VIc—7.5 parts of pigment composition and 11.0 parts of the microspheres.

Each of the six curable compositions were applied as 0.25 inch (6.4 mm)-thick coatings to separate curved sections formed from a steel plate that had previously been coated with primer composition containing 5 parts of n-propyl orthosilicate, 5 parts of tetrabutyltitanate, 5 parts of methylcellosolve orthosilicate and 85 parts of VM&P naphtha. The primer had been allowed to dry for 2 hours under ambient conditions prior to application of the curable organosiloxane composition to be evaluated.

The compositions were cured by heating the coated substrates for 2.5 hours at 150° C. followed by a one-hour post-cure at 200° C.

The erosion rates of the coated substrates were determined by exposing them to a stream of 50–70 mesh Ottawa sand. The velocity of the stream was 953 ft. (286 meters) per second and the angle of impingement with the substrate was 20°. The erosion rate was calculated as a function of the volume of cured composition removed per kilogram of sand.

The smoothness of the surfaces of the cured organosiloxane compositions following abrasion was determined by contacting the cured coatings with the edges of titanium blades rotating at a speed of 700 feet (210 meters) per second The amounts of curable composition and pigment composition and volume percent of microspheres present in the five compositions evaluated together with the erosion rate and appearance of the abraded surface of each of the coatings are recorded in the following table.

TABLE 1

| Composition (Parts) | I | II | IIIc | IVc | Vc | VIc |
|---|---|---|---|---|---|---|
| Curable Composition[1] | 88.9 | 92.6 | 97.6 | — | — | — |
| Curable Composition[2] | — | — | — | 86.2 | 86.2 | 91.5 |
| Pigment Composition | 6.9 | 7.6 | 8.2 | 7.1 | 7.1 | 7.5 |
| Microspheres (Volume %) | 44.4 | 33.3 | 16.5 | 44.4 | 44.4 | 33.3 |
| Erosion Rate (cc/kg) | 14.4 | 9.4 | Not Tested | 15.1 | 16.5 | 12.4 |
| Appearance of Machined Surface | Not Tested | Very Smooth | Fair | Rough | Rough | Not Tested |

[1]= Present invention (resin reinforcement)
[2]= Comparative Example (silica reinforcement)

The data in the foregoing table demonstrate that the erosion rates for comparative samples IVc and Vc containing silica as the reinforcing agent and 44.4 volume percent of microspheres were substantially higher than for sample I, which contained the same concentration of microspheres with a resinous organosiloxane copolymer of the present invention as the reinforcing agent. The same is true for the relative erosion rates of samples II and VIc. The reduction in smoothness of the machined surface on Sample IIIc demonstrates that the concentration of microspheres was insufficient to provide the desired machinability of the composition.

That which is claimed is:

1. An improved curable elastomeric organosiloxane composition comprising:
   A. a curable polyorganosiloxane containing at least two alkenyl radicals per molecule;
   B. an organohydrogensiloxane containing an average of more than two silicon-bonded hydrogen atoms in an amount sufficient to crosslink said polyorganosiloxane;
   C. a curing catalyst selected from the group consisting of metals from the platinum group of the periodic table and compounds of said metals in a quantity sufficient to promote curing of said composition;
   D. sufficient quantities of a reinforcing agent and a non-reinforcing filler to impart machinability and erosion resistance to said composition, the improvement comprising the presence, as said reinforcing agent, from 10 to 20 percent by weight, based on the total weight of said composition, of a resinous organosiloxane copolymer comprising $R^1_3SiO_{1/2}$, $R^1_2R^2SiO_{1/2}$ and $SiO_{4/2}$ units, wherein $R^1$ is an alkyl radical and $R^2$ is an alkenyl radical, and at least 2 weight percent of the units in said copolymer contain alkenyl radicals, and the molar ratio of $R^1_2R^2SiO_{1/2}:R^1_3SiO_{1/2}:SiO_{4/2}$ is 0.08–0.1:0.06–1:1 and as the non-reinforcing filler of from 15 to 30 weight percent, based on the weight of said composition, of finely divided quartz and at least 20 percent, based on the total volume of said composition, of thermally resistant microspheres, and wherein when cured, components (A) through (D) form an elastomer.

2. A composition according to claim 1 wherein said thermally resistant microspheres are inorganic and constitute from 30 to 45 percent of the total volume of said composition, the units of said copolymer containing alkenyl radicals constituting from 2 to 8 weight percent of said copolymer, $R^1$ is methyl, $R^2$ is vinyl or 5-hexenyl, and said curable polyorganosiloxane (A) is a polydiorganosiloxane represented by the formula

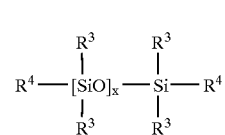

(I)

wherein each $R^3$ is individually selected from monovalent hydrocarbon radicals, $R^4$ represents an alkenyl radical, and x represents a degree of polymerization equivalent to a viscosity of at least 0.1 Pa.s.

3. A composition according to claim 2 wherein said thermally resistant microspheres are glass and have a density of from 0.2 to 0.6 g/cc, the particle size of said quartz is from 0.5 to 50 microns, and the viscosity of said curable polyorganosiloxane (A) is from 0.1 to 100 Pa.s, $R^3$ is methyl and $R^4$ is vinyl or 5-hexenyl.

* * * * *